(12) United States Patent
Buettiker

(10) Patent No.: US 12,178,356 B2
(45) Date of Patent: Dec. 31, 2024

(54) METHOD FOR PRODUCING A COFFEE BEVERAGE IN A COFFEE MACHINE

(71) Applicant: JURA Elektroapparate AG, Niederbuchsiten (CH)

(72) Inventor: Philipp Buettiker, Oberbuchsiten (CH)

(73) Assignee: JURA Elektroapparate AG, Niederbuchsiten (CH)

(*) Notice: Subject to any disclaimer, the term of this patent is extended or adjusted under 35 U.S.C. 154(b) by 834 days.

(21) Appl. No.: 17/288,239

(22) PCT Filed: Oct. 25, 2019

(86) PCT No.: PCT/CH2019/000030
§ 371 (c)(1),
(2) Date: Apr. 23, 2021

(87) PCT Pub. No.: WO2020/082190
PCT Pub. Date: Apr. 30, 2020

(65) Prior Publication Data
US 2021/0386238 A1    Dec. 16, 2021

(30) Foreign Application Priority Data

Oct. 25, 2018 (EP) .................................... 18202645

(51) Int. Cl.
*A47J 31/46* (2006.01)
*A23F 5/26* (2006.01)
(Continued)

(52) U.S. Cl.
CPC ............... *A47J 31/469* (2018.08); *A23F 5/26* (2013.01); *A47J 31/002* (2013.01); *A47J 31/404* (2013.01); *A47J 31/461* (2018.08)

(58) Field of Classification Search
CPC ...... A47J 31/469; A47J 31/461; A47J 31/002; A47J 31/404; A23F 5/26
See application file for complete search history.

(56) References Cited

U.S. PATENT DOCUMENTS 5,259,296 A    11/1993    Mikael et al.
5,403,605 A *  4/1995    Smith .................... A47J 31/002
                                                    426/433
(Continued)

FOREIGN PATENT DOCUMENTS

CN    102985406 A    3/2013
CN    105942863 A    9/2016
(Continued)

OTHER PUBLICATIONS

International Search Report in PCT/CH2019/000030, mailed Jan. 21, 2020.
(Continued)

*Primary Examiner* — Steven N Leff
(74) *Attorney, Agent, or Firm* — Collard & Roe, P.C.

(57) ABSTRACT

A method for producing a coffee beverage in a coffee machine including: a brewing device having a brewing chamber that receives ground coffee and includes a fluid inlet and a fluid outlet; a fluid system having a fluid feed line connected to the inlet and a fluid conveyor conveying a heated fluid through the feed line. The method includes: (a) introducing ground coffee into the chamber, (b) conveying heated fluid through the feed line into the chamber for brewing the ground coffee in the chamber and dispensing the beverage through the fluid outlet. Before step (a), heated fluid is fed through the feed line into the chamber and at least a part of this heated fluid is dispensed through a drainage outlet separate from the fluid outlet and fluidly communicating with the chamber and/or the feed line, to preheat the feed line and the brewing device before beverage preparation.

14 Claims, 3 Drawing Sheets

(51) Int. Cl.
*A47J 31/00* (2006.01)
*A47J 31/40* (2006.01)

(56) References Cited

U.S. PATENT DOCUMENTS

| | | | | |
|---|---|---|---|---|
| 5,657,683 | A | * | 8/1997 | Sandei ................ A47J 31/3609 99/287 |
| 8,931,399 | B2 | | 1/2015 | Buettiker |
| 9,247,844 | B2 | | 2/2016 | Castelli et al. |
| 2008/0264264 | A1 | | 10/2008 | Morgandi |
| 2013/0337132 | A1 | | 12/2013 | Fenna et al. |
| 2014/0147560 | A1 | * | 5/2014 | Radhakrishnan ... A47J 31/3614 99/283 |
| 2015/0359381 | A1 | | 12/2015 | Anthony et al. |

FOREIGN PATENT DOCUMENTS

| | | | |
|---|---|---|---|
| DE | 699 11 675 T2 | | 4/2004 |
| EP | 0 559 620 A1 | | 9/1993 |
| EP | 1264568 A1 | * 12/2002 | .......... A47J 31/3609 |
| EP | 2 168 466 A1 | | 3/2010 |
| EP | 2 881 016 A1 | | 6/2015 |
| WO | 2012001592 A1 | | 1/2012 |
| WO | 2012/069958 A1 | | 5/2012 |

OTHER PUBLICATIONS

D2-SuperautoPro. "Jura Impressa S9 One-Touch Video" 1-15, Youtube, Aug. 22, 2018 (Aug. 22, 2018), pp. 1-3, Retrieved from the Internet: https://www.youtube.com/watch?v=b90-AKHyo3E [retrieved on Mar. 7, 2019], includes screenshots of a Youtoube-Video as shown on a display, the screenshots including text strings in English. The Video itself includes spoken language in English.

D3-Anonymous. "Gebrauchsanweisung Kaffeevollautomat", Jul. 19, 2017 (Jul. 19, 2017). pp. 1-80. Retrieved from the Internet: https://www.miele.de/pmedia/ZGA/TX2070/ 10781120-000-02_10781120-02.pdf [retrieved on Mar. 5, 2019], including corresponding manual including operating instructions in English for the same coffee machines CM 5300, CM 5400 and CM 5500 as distributed by the company Miele in the United Kingdom.

PCT—International Preliminary Report on Patentability of International Application No. PCT/CH2019/000030, Dated Apr. 25, 2021 (English translation).

* cited by examiner

METHOD FOR PRODUCING A COFFEE BEVERAGE IN A COFFEE MACHINE

CROSS REFERENCE TO RELATED APPLICATIONS

This application is the National Stage of PCT/CH2019/000030 filed on Oct. 25, 2019, which claims priority under 35 U.S.C. § 119 of European Application No. 18202645.0 filed on Oct. 25, 2018, the disclosure of which is incorporated by reference. The international application under PCT article 21(2) was not published in English.

TECHNICAL DOMAIN

The invention relates to a method for producing a coffee beverage in a coffee machine.

PRIOR ART

A coffee machine in accordance with the prior art usually comprises a brewing device with a brewing chamber for receiving coffee powder, said brewing chamber comprising at least one fluid inlet and one fluid outlet, and a fluid system with a fluid feed line connected to the fluid inlet and a fluid conveyor for conveying a heated fluid (for example water and/or steam) through the fluid feed line.

A coffee beverage can be produced with a coffee machine of this type on the basis of a method which generally comprises the following steps:

introducing a predetermined quantity of coffee powder into the brewing chamber,
conveying heated fluid through the fluid feed line into the brewing chamber for preparing a coffee beverage through brewing the coffee powder in the brewing chamber and dispensing a prepared coffee beverage from the brewing chamber through the fluid outlet.

To produce a coffee beverage, a brewing device of the aforementioned type is usually supplied with a fluid in the form of hot water or brewing water, which coming from a water tank is initially fed by means of pumps or similar devices through a continuous flow heater and heated there. Brewing devices are also known in which the fluid is initially fully heated in a larger tank and then fed to the brewing unit. In each case, after the heating process, the heated water then passes through a more or less long pipeline section until the fluid reached the fluid inlet of the brewing chamber via the fluid feed line.

This results, in particular, in the problem that the pipeline section lying between the heating device for heating the fluid and the fluid inlet of the brewing chamber can be of different temperatures depending on the nature, time and frequency of prior brewing processes. The actual temperature of the fluid at the inlet to the brewing chamber, and the temperature of the coffee beverage producible by way of brewing coffee powder with the fluid in the brewing chamber cannot therefore be predicted.

With regard to producing a (hot) coffee beverage, brewing temperatures in the range 90 to 95° C. are generally considered to be ideal.

If, after producing a first coffee beverage, a coffee machine of the aforementioned type is only used to produce a second coffee beverage after a long waiting time, during the waiting time the brewing device and the fluid feed line can cool to a lower temperature. In this case, the second coffee beverage can in some circumstances be at a lower temperature than the first coffee beverage, particularly as the fluid that has to be conveyed through the fluid feed line to the brewing chamber to produce the second coffee beverage has to give off heat to the previously cooled down fluid feed line and the previously cooled down brewing device, so that on flowing through the fluid feed line, heat is removed from the fluid and the temperature of the fluid is thereby lowered.

Such a reduction in the temperature of the fluid is particularly noticeable if the produced coffee beverage is of small volume, for example less than 50 ml, which equates to a typical volume of coffee beverages such as ristretto or espresso. Accordingly, with a coffee machine of the aforementioned kind, dispensing a small amount of a coffee beverage (e.g. ristretto or espresso) at a predetermined high temperature into a drinking vessel is problematic.

This is disadvantageous as too high a brewing temperature extracts more bitter substances from the coffee to be brewed, as a result of which the dispensed coffee tastes bitter. On the other hand, too low a brewing temperature is just as undesirable, as in this case the desired aromas are not released from the coffee powder and the produced coffee beverage tends to be tasteless.

For this problem, there are several solutions in the prior art for increasing the temperature of the fluid at the fluid inlet, if required, while taking into consideration the length of the fluid line between the brewing water heating device and the fluid inlet of the brewing chamber.

For example, it is possible to suitably increase the temperature of the fluid before producing a coffee beverage in order to compensate for heat losses due to the cooling of the fluid feed line and/or the brewing device during operation of the coffee machine. However, limits are set for such a temperature increase in order to prevent the coffee in the brewing chamber being excessively heated and, possibly, scalded, or being dispensed in boiling condition via the fluid outlet into a drinking vessel.

Known from publication US 2008/0264264 A1 is a device for preparing hot beverages through brewing suitable products (e.g. coffee) in a brewing chamber using hot water which can be provided by a heating device and supplied via a line to the brewing chamber. With regard to the provision of this hot water, there is the problem that the temperature of the water can decrease on the way from the heating device to the brewing chamber, and that this decrease in temperature is dependent on parameters which can randomly change. To resolve this problem a compensation device is implemented which dynamically compensates for the decrease in the water temperature in the line between the heating device and the brewing chamber. For compensation of the temperature decrease of the water in the line, the temperature of the water in the heating device is controlled by means of a control device so that the temperature of the water in the brewing chamber is within a predetermined range. The implementation of such control of the water temperature is generally complex and correspondingly costly.

Known from publication DE 699 11 675 T2 is a system in which a brewing device—in this case the brewing device of a coffee machine for preparing espresso—can be swivelled from an operating position into a rest position. After swivelling into the rest position, a heat-conducting area of the brewing device is in contact with a heating element with which the brewing device can be heated. During a subsequent brewing procedure, the brewing device heated in this way (in the rest position) is swivelled back into its operating position and can thus compensate for a possibly too low temperature of the brewing water supplied to the brewing device. In this case, the heated brewing water is supplied under pressure into the brewing chamber of the brewing device so that in the brewing chamber, brewed coffee in the form of expresso can be produced, whereby the brewed coffee can flow out the brewing chamber via a tube and be dispensed from the coffee machine. The provision of the heating element results in an increased space requirement and is also complex and, accordingly, costly.

The publication US 2013/0337132 A1 discloses a beverage preparation machine for producing a hot beverage in a brewing chamber through pouring a portion of hot water onto beverage solids (e.g. coffee powder) which are introduced into the brewing chamber. This beverage preparation machine comprises a heating device for producing a heated fluid in the form of heated liquid water or steam, and a fluid conveying device for supplying (or conveying) the heated fluid from the heating device through a fluid feed line to the beverage solids in the brewing chamber. During operation of the beverage preparation machine in a first operating phase, the beverage preparation machine is designed to convey heated water in the liquid state through the fluid feed line to the beverage solids introduced into the brewing chamber in order to allow the production of a beverage through brewing the beverage solids with the heated water, and in a second operating phase (designated "steam flushing" in US 2013/0337132 A1) to convey steam through the fluid feed line to the beverage solids introduced into the brewing chamber. Supplying steam to the beverage solids introduced into the brewing chamber can take place after the supplying, in the first operating phase, of heated water into the brewing chamber, in order, through the supply of steam, to bring about a reduction of a water pressure produced by the heated water in the brewing chamber. Alternatively, the supplying of steam to beverage solids introduced into the brewing chamber can also be carried out before the suppling of hot water into the brewing chamber in a first operating phase, in order, through supply steam, to allow drying or preheating of the areas of the beverage preparation machine through which the steam flows.

SUMMARY OF THE INVENTION

The problem underlying the present invention is to avoid the stated drawbacks and to create a method for producing a coffee beverage in a coffee machine, which with simple means makes it possible to produce a hot coffee beverage and to control the temperature of the produced coffee beverage.

This problem is solved by a method with the features of claim 1.

This method for producing a coffee beverage can be implemented with a coffee machine which comprises: a brewing device with a brewing chamber for receiving coffee powder, said brewing chamber having at least one fluid inlet and one fluid outlet, and a fluid system with a fluid feed line connected the fluid inlet, and a fluid conveyor for conveying a heated fluid through the fluid feed line, and with a drainage outlet separate from the fluid outlet, said drainage outlet being in, or being able to be brought into fluidic connection with the brewing chamber and/or the fluid feed line, so that residual fluid from the fluid feed line and/or the brewing chamber can be discharged via the drainage outlet. Here, the brewing device comprises: a brewing cylinder with an internal space which has a longitudinal axis and is limited on one end face by an end surface extending transversely to the longitudinal axis and is limited radially to the longitudinal axis by a side wall extending about the longitudinal axis; a brewing piston which extends in the direction of the longitudinal axis so that an end surface of the brewing piston is arranged opposite the end surface of the internal space, wherein the brewing chamber extends between the end surface of the internal space, the end surface of the brewing piston and the side wall and the brewing piston can be moved along the longitudinal axis so that a distance between the end surface of the internal space and the brewing piston is changeable. The method comprises the following steps (a)-(d):

(a) introducing a predetermined amount of coffee powder into the brewing chamber, (b) conveying heated fluid through the fluid feed line into the brewing chamber for preparing a coffee beverage through brewing the coffee powder in the brewing chamber and dispensing a prepared coffee beverage from the brewing chamber through the fluid outlet, (c) supplying a first quantity of heated fluid through the fluid feed line into the brewing chamber, whereby step (c) is carried out before step (a).

(d) discharging at least one part of the first quantity of heated fluid supplied in step from the brewing chamber before the start of step (a), wherein in step (d) the at least one part of the first quantity of heated water supplied in step (c) is discharged through the drainage outlet.

According to the invention, the method comprises the following steps (f) and (g):

(f) before the start of or during step (c), the brewing piston is arranged in such a way that the brewing piston is at a first predetermined distance relative to the end surface of the internal space;

(g) during step (d), the brewing piston is moved along the longitudinal axis so that the brewing piston is relative to the end surface of the internal space at a distance which is smaller than the first predetermined distance.

Accordingly, before the preparation of a hot coffee beverage (i.e. before coffee powder is introduced into brewing chamber for the purpose of preparing the coffee beverage and heated fluid for brewing the coffee powder is conveyed though the fluid feed line into the brewing chamber), in step (c) a first quantity of heated fluid (e.g. water or steam) is initially conveyed through the fluid feed line into the brewing chamber. If the fluid feed line and/or the brewing device is/are at a temperature which is lower than the temperature of the heated fluid, then during step (c) heat would be transferred to the fluid feed line and/or the brewing device so that the fluid feed line and/or the brewing device is/are heated and the temperature of the fluid feed line and/or the temperature of the brewing device is increased, particularly in those areas of the fluid feed line and/or the brewing device which are in direct contact with the heated fluid during step (c). In this way it is possible to preheat the fluid feed line and/or the brewing device before coffee power is introduced into the brewing chamber for the purpose of preparing the coffee beverage and heated water for brewing the coffee powder is conveyed through the fluid feed line into the brewing chamber.

In this way, during step (c) it is, in particular, possible to preheat the fluid feed line and the brewing device and/or brewing chamber in those areas which during step (b) come into contact for the purpose of brewing the coffee powder with heated fluid. Accordingly, this preheating is efficient in terms of controlling the temperature of the heated fluid which is conveyed into the brewing chamber during step (b).

Through supplying the heated fluid during step (c) it is, in particular, possible to compensate for heat losses that may possibly have occurred during operation of the coffee machine before the production of a coffee beverage in accordance with steps (a) and (b), e.g. if, during a long waiting period before producing the coffee beverage in accordance with steps (a) and (b), the coffee machine has not been used to produce a coffee beverage in the brewing chamber, and the fluid feed line and/or the brewing device has/have cooled down during this waiting period.

Through the aforementioned preheating of the fluid feed line and/or the brewing device, it is possible that the coffee beverage produced in steps (a) and (b) has a higher temperature compared with the temperature that would have been achieved if step (c) had been dispensed with. More particularly, through suppling heated fluid during step (c), it is possible to heat the fluid feed line and/or the brewing device to a predetermined temperature. In this way it is possible to control the temperature of the produced coffee beverage so that the temperature of the produced coffee beverage lies within a predefined range.

The method has the advantage that it is simple to implement with the technical means which are generally available in a conventional coffee machine of the above type and at least allow a heated fluid to be fed into a brewing chamber. To implement the method, it is only necessary to suitably control the conveying of the heated fluid through the fluid feed line into the brewing chamber as a function of time.

As at least one part of the first quantity of heated fluid supplied in step (c) is discharged from the brewing chamber in step (d), before introducing coffee powder into the brewing chamber, the brewing chamber can initially be cleaned with the first quantity of heated fluid supplied in step (c). For example, in doing so the brewing chamber can be cleared of residues of a coffee beverage prepared at an earlier point in time, of which a small remainder may have been left in the brewing chamber as a residue adhering to a wall of the brewing chamber.

As at least one part of the first quantity of heated fluid supplied in step (c) is discharged from the brewing chamber, this also means that the volume of the first quantity of heated fluid conveyed into the brewing chamber in step (c), can be relatively large (e.g. so large that the brewing chamber is partially or completely filled with the heated fluid). As in step (d) at least one part of the first quantity of fluid supplied in step (c) is discharged from the brewing chamber, it is ensured that during step (a) a sufficiently large area of the brewing chamber is available for receiving dry coffee powder. It can also be achieved that the coffee powder in the brewing chamber is essentially brewed with the heated fluid during step (b) and not during step (a).

As the drainage outlet is separate from the fluid outlet and can be brought into, or is, in fluid connection with the brewing chamber and/or the fluid feed line, so that residual fluid from the fluid feed line and/or the brewing chamber can be discharged through the drainage outlet, in step (d), the heated fluid supplied in step (c) does not have to leave the brewing chamber through the fluid outlet. The fluid outlet is designed so that a coffee beverage prepared in the brewing chamber in step (b) can leave the brewing chamber through the fluid outlet, for example into a drinking vessel which a user of the coffee machine generally places under the fluid outlet, before the user causes the coffee machine to prepare a coffee beverage and dispense it through the fluid outlet into the drinking vessel. As in step (d), the heated fluid supplied in step (c) is discharged through the drainage outlet and not through the fluid outlet, it is advantageously achieved that steps (c) and (d) can be carried out at any time, irrespective of whether a user of the coffee machine has placed a drinking vessel under the fluid outlet or not. In this manner, it is prevented that heated fluid, which is conveyed into the brewing chamber in step (c) for the purpose of preheating, is enabled to leave the brewing chamber through the fluid outlet during step (d) and undesirably ends up in a drinking vessel which may have been placed by a user under the fluid outlet (in the expectation that the coffee machine will dispense a coffee beverage through the fluid outlet).

In this case the position of the end surface of the brewing piston relative to the end surface of the internal space of the brewing cylinder determines the volume of the brewing chamber. As the brewing piston can be moved along the longitudinal axis, so that a distance between the end surface of the internal space and the brewing piston is changeable, it is ensured that the volume of the brewing chamber can be changed. For example, during step (a) a predetermined quantity of coffee powder can be introduced into the internal space of the brewing cylinder and the brewing piston can then be positioned in the internal space of the brewing cylinder relative to the end surface of the internal space in such a way that the coffee powder is arranged in the brewing chamber (i.e. between the end surface of the internal space, the side wall of the internal space and the end surface of the brewing piston) in such a way that the coffee powder completely fills the brewing chamber. After introducing the coffee powder into the internal space of the brewing cylinder, the brewing piston can be moved so close to the end surface of the internal space that the coffee powder is compressed in the brewing chamber between the end surface of the internal space and the end surface of the brewing piston so that the coffee powder in the brewing chamber forms as compact a mass as possible with a high density.

By way of step (f), i.e. due to the fact that before the start of or during step (c), the brewing piston is arranged in such a way that the brewing piston is at a first predetermined distance relative to the end surface of the internal space, the volume of the brewing chamber is such that the brewing chamber can be fully or at least partially filled with the first quantity of heated fluid supplied in step (c). If the brewing chamber is completely filled with the heated fluid it is ensured that in step (c) the brewing piston is brought into contact with the heated fluid so that in this way the brewing piston is efficiently pre-heated.

By way of step (g), i.e. due to the fact that during step (d), the brewing piston is moved along the longitudinal axis so that the brewing piston is at distance relative to the end surface of the internal space which is smaller than the first predetermined distance, the brewing piston is moved in the direction of the end surface of the internal space and the volume of the brewing chamber is thereby reduced. Through the movement of the brewing piston in the direction of end surface of the internal space, in step (g), the first quantity of heated fluid conveyed into the brewing chamber in step (c) is completely or partially displaced out of the brewing chamber. The fluid displaced out of the brewing chamber during step (g) is discharged through the drainage outlet, into a residual fluid container, for example.

To optimise the above-described pre-heating of the fluid feed line and the brewing device or brewing chamber, step (c) can be carried out in various ways or combined with various measures.

In one form of embodiment of the method, step (c) is carried out at a predefined first time interval before the start of step (a). Supplying the first quantity of heated fluid through the fluid feed line into the brewing chamber takes place correlated in time with the production of a coffee beverage, i.e. the supplying of a first quantity of heated fluid starts at a predetermined time interval before introducing the coffee powder into the brewing chamber. This has the advantage that the respective temperatures which the fluid feed line and/or the brewing chamber or brewing device have during the preparation of a coffee beverage in steps (a) and (b) can be easily controlled, for example, through suitable specification of the duration of the first time interval, the temperature of the heated fluid during step (c) and the volume of the first quantity of heated fluid.

The coffee machine can also comprise a residual fluid container for receiving residual fluid discharged out of the draining outlet. In this case the method can be advantageously carried out in that in step (d) the at least one part of the first quantity of heated fluid supplied in step (c) is discharged into the residual fluid container.

Other further developments of the aforementioned form of embodiment of the method are conceived in such a way that step (d) is carried out at a predetermined second time interval before the start of step (a). This means that the discharging of at least one part of the first quantity of heated fluid supplied in step (c) from the brewing chamber takes place correlated in time with the start of step (a). The purpose of this measure is to control the respective temperatures of the brewing device or brewing chamber during the preparation of a coffee beverage during steps (a) and (b) with great precision.

Here, for example, the supplying of the first quantity of heated fluid in accordance with step (c) can be ended at a first end time and the start of the second time interval can follow the first end time with a predetermined first time difference. This first time difference defines for how long the first quantity of heated fluid supplied in step (c) remains in the brewing chamber before, in accordance with step (d) the at least one part of the first quantity of heated fluid supplied in step (c) is discharged from the brewing chamber. The first time difference therefore has an influence on the period of time in which the brewing device is preheated by the heated fluid which is conveyed into the brewing chamber in step (c). Specifying the first time difference therefore has an influence on the temperature of the brewing device or brewing chamber during the preparation of a coffee beverage in accordance with steps (a) and (b). Suitable specification of the first time difference thereby allows control of the temperature of the brewing device or brewing chamber during the preparation of a coffee beverage in accordance with steps (a) and (b).

To enable user-friendly operation of the coffee machine it is, for example, expedient to select the time difference so that the first time difference is in the range from 0 to 10 seconds.

Another form of embodiment of the method requires that the coffee machine comprises a drainage outlet which is in, or can brought into, fluidic connection with the brewing chamber and/or the fluid feed line and is configured to discharge a residual fluid from the fluid feed line and/or the brewing chamber. This form of embodiment of the method comprises the following step (e):

(e) conveying of a second quantity of heated fluid through the fluid feed line, and discharging the second quantity of heated fluid through the drainage outlet, whereby step (e) is carried out before step (c). As in step (e) a second quantity of heated fluid is initially conveyed through the fluid feed line and discharged through the drainage outlet before heated fluid is supplied to the brewing chamber in step (c), for a determined period of time in step (e) heated fluid flows through the fluid feed line which can then assume a temperature that corresponds with the temperature of the heated fluid. When, subsequent to step (e), heated water is conveyed into the brewing chamber in step (c), in the above circumstances the heated fluid conveyed through the fluid feed line during step (c) gives off relatively little heat to the fluid feed line on its way to the brewing chamber and thus reaches the brewing chamber with relatively little heat loss. In this way it is ensured that the first quantity of heated fluid, which is conveyed through the fluid feed line into the brewing chamber in step (c), has a particularly high temperature at the fluid inlet to the brewing chamber, thereby allowing particularly efficient pre-heating of the brewing chamber.

A further development of the aforementioned form of embodiment of the method can be advantageously implemented with a coffee machine that comprises a residual fluid container for receiving residual fluid discharged from the drainage outlet. In this case, in step (e) the second quantity of heated fluid can be discharged into the residual fluid container.

Expediently, the method can be implemented in that the heated fluid (e.g. water or steam) when being supplied in accordance with step (c) is at a temperature in the range of 75-115° C. Accordingly, when being conveyed in accordance with step (e), the heated fluid can be at a temperature that is in the range of 75-115° C.

More particularly, the method can be implemented in that the first quantity of heated fluid has such a large volume that during step (c) the brewing chamber is fully or partially filled with heated fluid. In this way it is ensured that essential areas of the brewing chamber, which in step (a) come into contact with coffee powder and in step (b) with heated fluid, are already pre-heated with heated fluid in step (c) and can thus be brought to a higher temperature.

A further development of the above form of embodiment of the method is characterised in that the method comprises the following step (h):

(h) before the start of or during step (e), the brewing piston is arranged in such a way that the brewing piston is at a distance relative to the end surface of the internal space that is equal to a predetermined minimum value.

Through this, before the start of or during step (e), the volume of the brewing chamber is reduced in such a way that the volume of the brewing chamber becomes as small as possible. The predetermined minimum value can, for example, be equal to 0, wherein in this case the volume of the brewing chamber is reduced to 0. If in these circumstances, in step (e) a second quantity of heated fluid is conveyed through the fluid feed line and discharged through the drainage outlet, either only a small portion of this second quantity of heated fluid can flow into the brewing chamber in step (e) (if the brewing piston is arranged so that the volume of the brewing chamber is greater than zero), or the second quantity of heated fluid is conveyed through the fluid feed line and discharged through the drainage outlet without a portion of the second quantity of heated fluid being able flow into the brewing chamber (if the brewing piston is arranged so that the volume of the brewing chamber has the value 0). In this way, in step (e) the fluid feed line can be particularly efficiently heated up by the second quantity of heated fluid, whereby the heated fluid is mainly, or even exclusively, available for heating the fluid feed line.

BRIEF DESCRIPTION OF THE DRAWINGS

Further details of the invention and, in particular, examples of forms of embodiment of the method according to the invention are explained below with reference to the attached drawings. In these

DESCRIPTION OF FORMS OF EMBODIMENT

Unless otherwise stated, the same reference numbers are used for the same elements in the figures.

Figure 1:
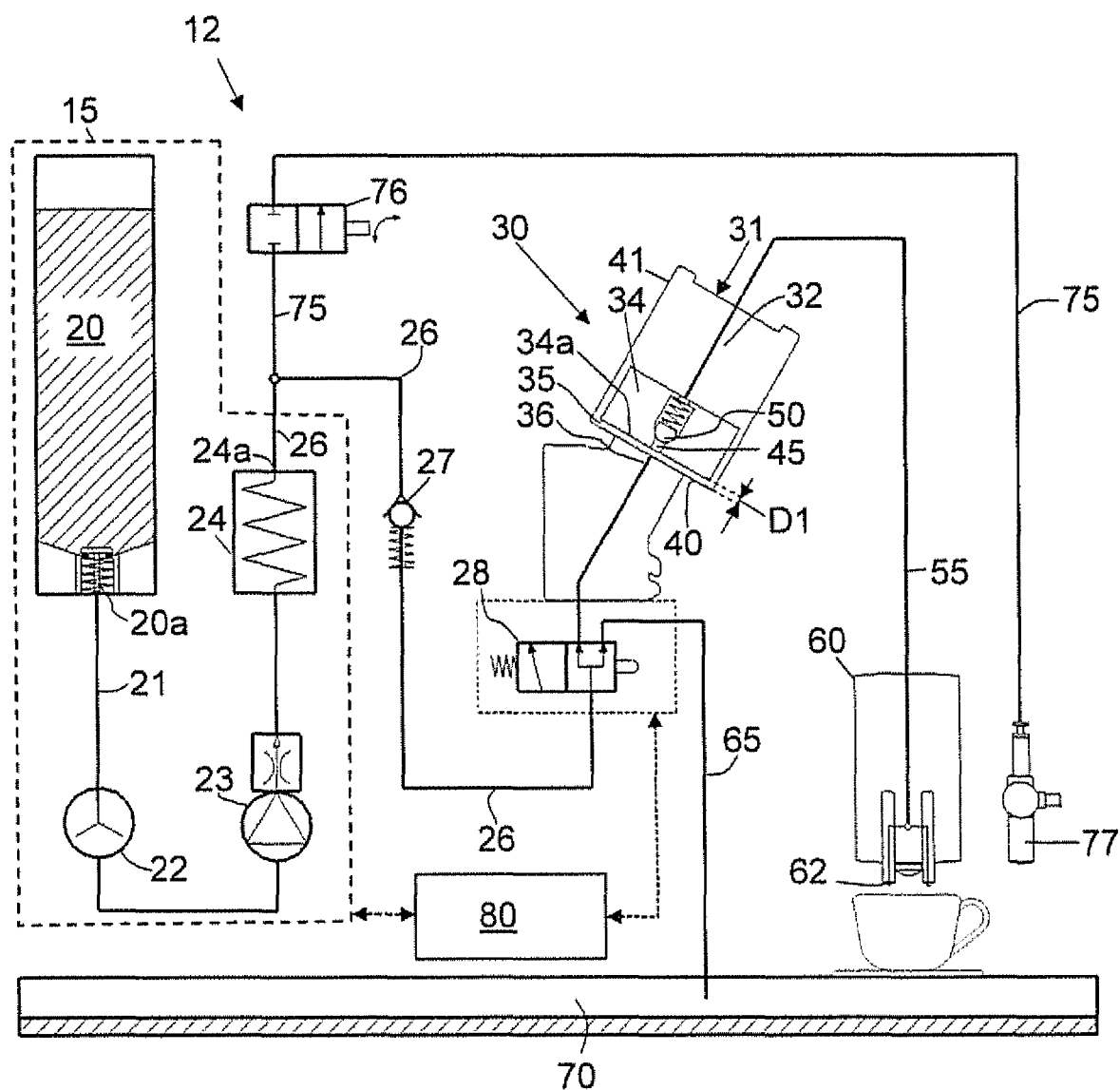
FIG. 1 shows a schematic view of a coffee machine in a condition which is suitable for implementing a step of one form of embodiment of the method according to the invention.
Figure 2:
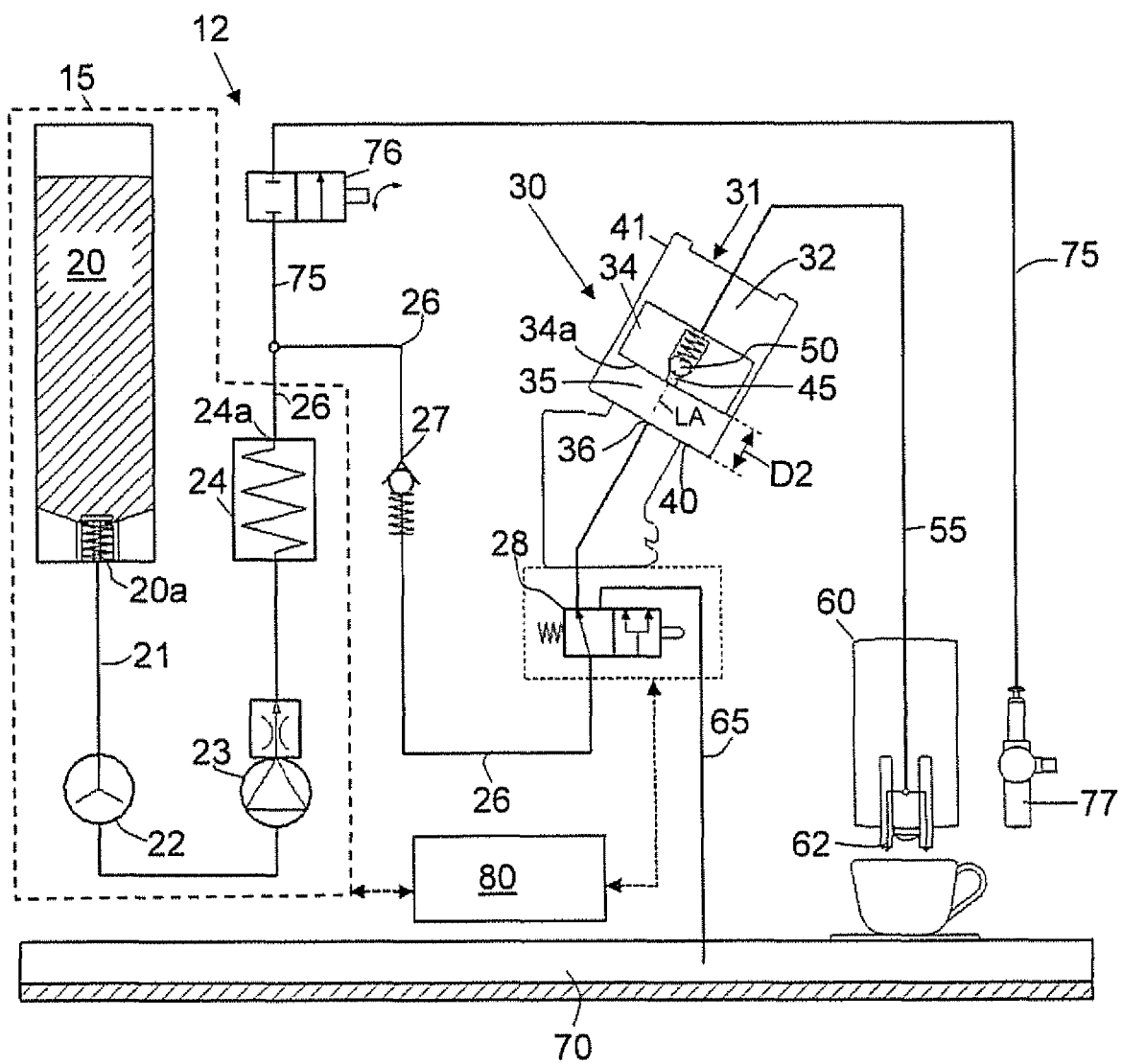
FIG. 2 shows a coffee machine according to FIG. 1 in a condition which is suitable for implementing another step of the method according to the invention.
Figure 3:
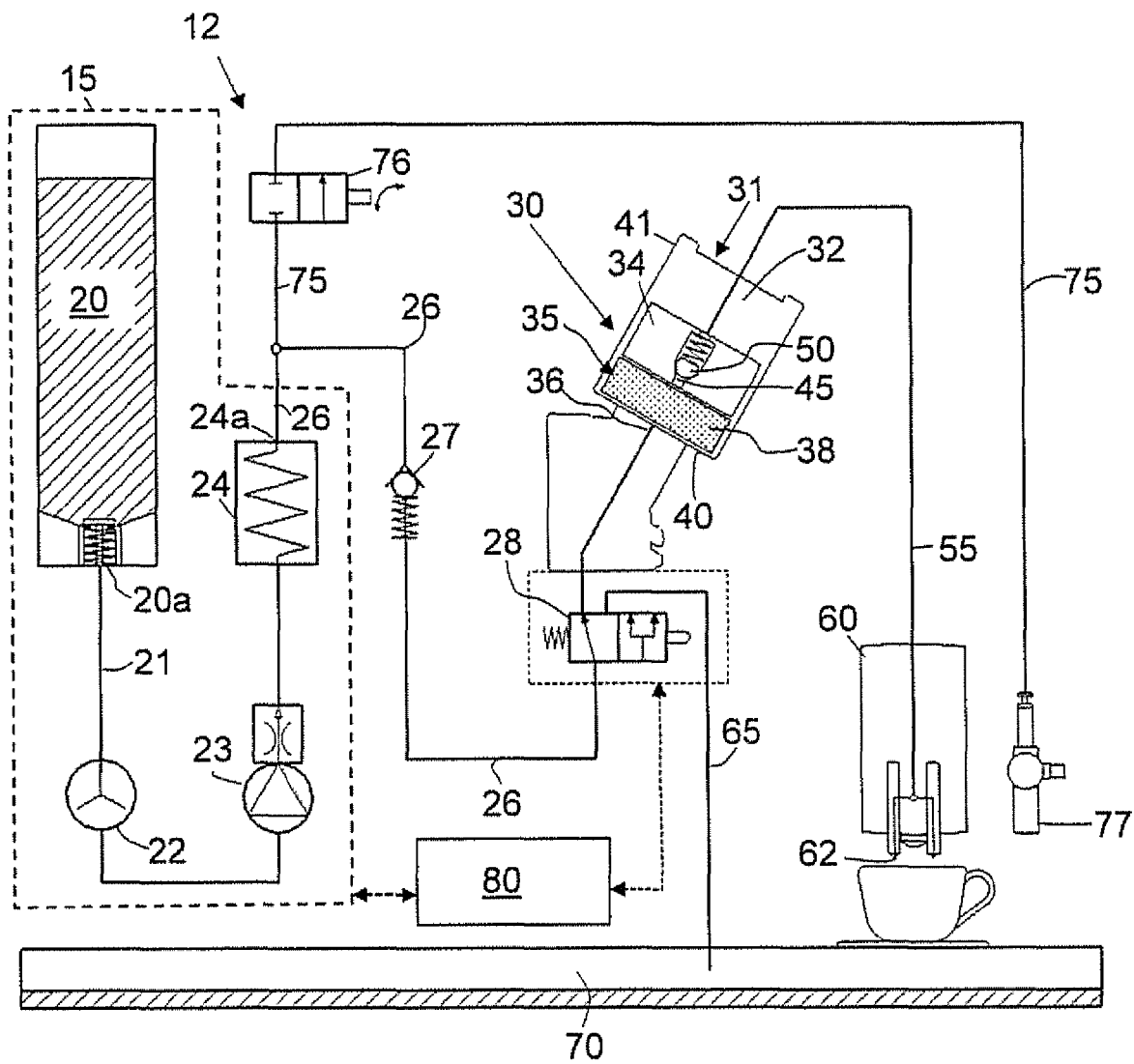
FIG. 3 shows the coffee machine according to FIG. 1 in a condition which is suitable for implementing a further step of the method according to the invention.

FIGS. 1-3 show a coffee machine 10 in various operating conditions, which correspond to different steps of a method according to the invention for producing a coffee beverage.

As can be seen, the coffee machine 10 comprises: a brewing device 30 with a brewing chamber 35 for receiving coffee powder, said brewing chamber 35 having at least one fluid inlet 36 and one fluid outlet 45; a fluid system 12 with a fluid feed line 26 connected to the fluid inlet 36 and fluid conveyor 15 for conveying a heated fluid through the fluid feed line 26.

In the present example, the coffee machine 10 is designed in such a way that the brewing device 30 comprises a brewing cylinder 21 with a (cylindrical) internal space 32 having a longitudinal axis LA and a brewing piston 34 arranged in the internal space 32 for the brewing cylinder 31. The internal space 32 of the brewing cylinder 31 is configured so that at its end face it is delimited by an end surface 40 extending transversely to the longitudinal axis LA, and radially to the longitudinal axis LA, by a side wall 41 extending around the longitudinal axis LA. The brewing piston 34 extends in the direction of the longitudinal axis LA in such a way that an end surface 34a of the brewing piston 34 is arranged opposite the end surface 40. In the present example, the brewing chamber 35 is a section of the internal space 32 of the brewing cylinder 31: the brewing chamber 35 extends between the end surface 40 of the internal space 32 (or of the brewing cylinder 31), the end surface 34a of the brewing piston 34 and the side wall 41 of the internal space 32. The brewing piston 34 is formed so that a cross-sectional area of the brewing piston 34 relative to a plane perpendicular to the longitudinal axis LA essentially matches a corresponding cross-sectional area of the internal space 32 of the brewing cylinder 31, so that the brewing piston 32 adjoins the side wall 41 of the internal space 32 along a circumferential line extending around the longitudinal axis LA.

The brewing piston 34 can be moved along the longitudinal axis LA so that a distance between the end surface 40 and the end surface 34a of the brewing piston 34 is changeable. In this case, a change in the distance between end surface 40 and end surface 34a of the brewing piston 34 corresponds with a change in the volume of the brewing chamber 35.

In each of FIGS. 1-3, the brewing device 30 is shown in such a way that the brewing piston 34 is arranged inside the internal space 32 of the brewing cylinder 31, whereby in accordance with FIGS. 1-3 the brewing piston 34 can be arranged at different distances relative to the end surface 40: in FIG. 1 and FIG. 2 the distance between end surface 40 and end surface 34a of the brewing piston 34 is shown as D1 and D2 respectively, wherein D2 is larger than D1. However, it should be pointed out that the brewing piston 34 can be moved along longitudinal axis LA from the end surface 40 of the internal space 32 (or the brewing cylinder 31) to such an extent that the brewing piston 34 can be moved into an area at the periphery of the brewing device 30 so that the brewing piston 34 is completely outside the internal space 32.

In the case of the brewing device 30, in order to be able to introduce coffee powder into the brewing chamber 35, the brewing piston 34 is moved along longitudinal axis LA away from the end surface 40 of the internal space 32 (or the brewing cylinder 31) until the brewing piston 34 is completely outside the internal space 32. In this case (in contrast to the situations shown in FIGS. 1-3), the brewing piston 34 does not protrude into the internal space 32, so that the internal space 32 is open up to the side opposite the end surface 40 and is freely accessible from this side of the internal space 32 opposite the end surface 40. In these circumstances it is possible to introduce into the internal space 32 (by means of a device suitable for this, not shown in the figures) a predetermined quantity of coffee powder from the side of the internal space 32 opposite the end surface 40, so that the coffee powder introduced into the internal space 32 in this way is heaped onto the end surface 40 of the internal space 32 (or the brewing cylinder 31) and finally forms a layer covering the end surface 40. The brewing piston 34 can then be moved along the longitudinal axis LA in the direction of the end surface 40 in order to insert the brewing piston 34 back into the internal space 32 so that the coffee powder is enclosed in a space defined by the end surface 40, the side wall 41 and the end surface 34a of the brewing piston 34, and completely fills this space. This space defined by the end surface 40, the side wall 41 and the end surface 34a of the brewing piston 34 and filled with coffee powder is a realization of the brewing chamber 35 in accordance with FIGS. 1-3.

Coffee powder can be introduced into the brewing chamber 35 by way of means that form part of the prior art and will not therefore be described in detail at this point. In order to facilitate introducing coffee power into the brewing chamber 35 it is, for example, possible to arrange the brewing cylinder 31 in a moveable manner such that as soon as the brewing piston 34 has been moved in the direction of the longitudinal axis LA until the brewing piston 34 is completely outside the internal space 32, the brewing cylinder 31 can be moved relative to the brewing piston 34 in order to bring the brewing cylinder 31 into another spatial position in which the internal space 32 of the brewing cylinder 31 is particularly easily accessible in order to introduce coffee powder from the side of the internal space 32 opposite the end surface 40 into the internal space 32. For this purpose, the brewing cylinder 31 can be arranged in such a way that the brewing cylinder 31 can be swivelled about an axis of rotation as soon as the brewing piston 34 is completely outside the internal space 32. In this case, the brewing cylinder 31 can by way of a swivelling movement about the axis of rotation be brought into a spatial position in which the internal space 32 of the brewing cylinder 31 can be simply filled directly from above with coffee powder which can be supplied to the internal space 32 vertically from above (in an analogue manner to a corresponding brewing cylinder which is known from publication EP 0 559 620 A1).

As indicated by FIGS. 1-3, the fluid conveyor 15 of the fluid system 12 comprises: a tank 20 for receiving fluid (e.g. fresh water) suitable for producing a coffee beverage; a fluid line 21 connected to a fluid outlet 20a of the tank 20, through which a fluid contained in the tank 20 can be conveyed; a flow measuring device 22 for measuring a flow of a fluid being conveyed through the fluid line 21; a fluid pump 23 for conveying a fluid through the fluid line 21; a heating device 24 (e.g. a heating device designed as a continuous flow heater), which is configured to heat a fluid being conveyed through the fluid line 21 to a predetermined or predeterminable temperature, for example a temperature in the range of 75-115° C. and to discharge a correspondingly heated fluid via an outlet 24a of the heating device 24.

As indicated by FIGS. 1-3, the fluid feed line 26 of the fluid system 12 is implemented in such a way that one end of the fluid feed line 26 is connected to the aforementioned outlet 24a of the heating device 24 and another end of the fluid feed line 26 is connected to the fluid inlet 36 of the brewing chamber 35, so that a fluid heated by the heating device 24 can be conveyed by means of the fluid pump 23 from the heating device 24, via the fluid feed line 26 and the fluid inlet 36 of the brewing chamber 35, into the brewing chamber 35.

As indicated by FIGS. 1-3, integrated into the fluid feed line 26 is a non-return valve 27 which is designed in such a way that a fluid which is discharged from outlet 24a of the heating device 24 and conveyed by the fluid conveyor 15 through the fluid feed line 26 reaches the fluid inlet 36 of the brewing chamber 35, whereas any flow of a fluid in the opposite direction (i.e. any flow of a fluid from the fluid inlet 36 of the brewing chamber 35 through the fluid feed line 26 to the outlet 24a of the heating device 24) is blocked by the non-return valve 27.

As indicated by FIGS. 1-3, the coffee machine 10 also comprises a drainage outlet 65 which is in, or can be brought into, a fluidic connection with the brewing chamber 35 and/or the fluid feed line 26, and is configured to discharge a residual fluid from the fluid feed line 26 and/or the brewing chamber 35 into a residual fluid container 70. The drainage outlet 65 is spatially apart (separate) from the fluid outlet 45 of the brewing chamber 35. In this context, the term "residual fluid" denotes a fluid which, although having reached the fluid feed line 26 and/or the brewing chamber 35 during operation of the coffee machine 10, does not form part of a coffee beverage and, accordingly, is not to be dispensed via the fluid outlet 45, and in particular not out of the brewing chamber 35 along with a coffee beverage prepared in the brewing chamber 35. In order to be able to control a discharge of such a residual fluid through the drainage outlet 65, the coffee machine 10 comprises a controllable directional control valve 28 which is configured to produce, as required, one fluidic connection or several fluid connections between the fluid feed line 26, the fluid inlet 36 of the brewing chamber 35 and/or the drainage outlet 65. In this example, the directional control value 28 is in the form of a "3/2-way valve" i.e. the directional control valve 28 can be brought into two switching positions in order (depending on the respective switching position of the directional control valve 28) to enable two different fluidic connections between three different ports of the directional control valve 28 to be produced, wherein the fluid feed line 26, the fluid inlet 36 of the brewing chamber 35 and the drainage outlet 65 are each connected to one of the aforesaid ports of the directional control valve 28.

FIG. 1 shows the coffee machine 10 in a situation in which the directional control valve 28 has been brought into one of the two different switching positions. In accordance with this switching position of the directional control valve 28, the fluid feed line 26, the fluid inlet 36 of the brewing chamber 35 and the drainage outlet 65 are fluidically connected to each other via the directional control valve 28. In this case, a fluid which by means of the fluid pump 23 is being conveyed from the outlet 24a of the heating device 24 through the fluid feed line 26 to the directional control valve 28, is guided via the directional control valve 28 both to the fluid inlet 36 of the brewing chamber 35 and also to the drainage outlet 65, or via the drainage outlet 65 into the residual fluid container 70. Similarly, a fluid can be conveyed from the brewing chamber 35, via the fluid inlet 36 of the brewing chamber 35 and the directional control valve 28 to the drainage outlet 65, so that the fluid can finally reach the residual fluid container 70 via the drainage outlet 65.

In contrast to FIG. 1, FIGS. 2 and 3 show the coffee machine 10 in situations in which the directional control valve 28 is brought into the other of the two different switching positions. According to this other of the two switching positions of the directional control valve 28, the fluid feed line 26 is in fluidic connection with the fluid inlet 36 of the brewing chamber 35, while the drainage outlet 65 is not in fluidic connection with either the fluid feed line 26 or with the fluid inlet 36 of the brewing chamber 35. In this case, a fluid which is being conveyed by the fluid pump 23 from the outlet 24a of the heating device 24 through the fluid feed line 26 to the directional control valve 28, is guided via the directional control valve 28 to the fluid inlet 36 of the brewing chamber 35, but not to the drainage outlet 65.

As shown in FIG. 1-3, in this example, the fluid inlet 36 of the brewing chamber 35 is arranged in the area of the end surface 40 of the brewing chamber 31 (or the internal space 32), so that a fluid which is being conveyed by the fluid pump 23 from the outlet 24a of the heating device 24 through the fluid feed line 26 and through the directional control valve 28 to the fluid inlet 36, can flow into the brewing chamber 35 in the area of the end surface 40. In this example, the fluid outlet 45 of the brewing chamber 35 is configured in the brewing piston 34 in such a way that the fluid outlet 45 at an end of the fluid outlet 45 facing the brewing chamber 35 is open towards the brewing chamber 35 in the area of the end surface 34a of the brewing piston 34 and at an end of the fluid outlet 45 facing away from the brewing chamber 35 is connected with an end of a coffee dispensing line 55. At another end, the coffee dispensing line 55 is connected to a coffee dispensing device 60 provided with at least one coffee outlet opening 62, so that a coffee beverage prepared in the brewing chamber 35 can flow through the fluid outlet 45 of the brewing chamber 35 and through the coffee dispensing line 55 to the coffee dispensing device 60, and can finally be dispensed through the coffee outlet opening 62, into a drinking vessel for example.

As also indicated in FIG. 1-3, a conventional crema valve 50 is integrated into the fluid outlet 45 which is configured to optionally prevent or allow a flow of a fluid from the brewing chamber 35, through the fluid outlet 45 into the coffee dispensing line 55 depending on the current pressure of the fluid in the brewing chamber 35. In this example, the crema valve 50 is implemented in such a way that the crema valve 50 allows a flow of a fluid from the brewing chamber 35 through the fluid outlet 45 into the coffee dispensing line 55 if the pressure of the fluid in the brewing chamber 35 is greater than a predetermined limit value (e.g. greater than 3 bar). In this way, the crema valve 50 makes it possible to brew coffee powder in the brewing chamber 35 with a pressurised fluid, in order to be able to prepare a coffee beverage such as espresso, for example. Accordingly, the fluid pump 23 is designed to convey a fluid at a pressure in the range of 4-20 bar through the fluid feed line 26 into the brewing chamber 35.

As indicated by FIGS. 1-3, the coffee machine 10 comprises an outlet 77 for dispensing hot water and/or steam which is connected by way of a hot water and/or steam line 75 to the outlet 24a of the heating device 24. In order to be able to control a flow of hot water and/or steam through the hot water and/or steam line 75, a controllable valve 76 is integrated into the hot water and/or steam line 75 which can be optionally opened or closed to respectively allow or prevent a flow of hot water and/or steam to the outlet 77.

The coffee machine 10 is also equipped with a control unit 80 to enable automatic operation of the coffee machine 10. For this purpose, the control unit 80 is, in particular, connected to the brewing device 30 in order to be able to control, for example, the position of the brewing piston 34 relative to the end surface 40 of the brewing cylinder 31 (or the internal space 32) and the introduction of a predetermined quantity of coffee powder into the brewing chamber 35. The control unit 80 is also connected to the flow measuring device 22, the fluid pump 23, the heating device 24, the directional control valve 28 and the valve 76 in order to be able to control the fluid pump 23, the heating device 24, the directional control valve 28 and the valve 76. The fluid pump 23, the directional control valve 28 and the valve 76 can be controlled by the control unit 80 in order to be able to convey a fluid (e.g. fresh water) provided in the tank 20 optionally through the fluid feed line 26 or the hot water and/or steam line 75. The heating device 24 can be controlled by the control unit 80 in order to heat the fluid conveyed by the fluid pump 23 to a predetermined or predeterminable temperature.

Below, a form of embodiment of the method according to the invention will be described with reference to FIGS. 1-3.

As an example, discussed in the following is the production of a coffee beverage, in particular the production of a "small" quantity of a coffee beverage with a volume in the range of 20-50 ml (e.g. espresso) using the coffee machine 10. It is assumed that to produce the coffee beverage in the brewing chamber 35 of the brewing device 30, coffee powder is to be brewed with heated fluid (water) which should be at a temperature in the range of 90-95° C.

It is also assumed that at the start of the method the brewing chamber 35 of the brewing device 30 is empty, i.e. not filled with the coffee powder required for producing the coffee beverage. It is further assumed that at the start of the method, the control unit 80 of the coffee machine 10 receives from an operator a "command" which initiates the production of the coffee beverage, for example, in the form of control signals which, for example, can be generated by means of manually operable operating elements and can be sent to the control unit 80. It is also assumed that during a longer waiting time before this initiating "command", the coffee machine 10 has not been used to produce a coffee beverage. Under these circumstances, it is assumed that the fluid feed line 26 and the brewing device 30 have cooled during the waiting period to a temperature that is much lower than 90-95° C.

FIG. 1 shows the coffee machine 10 during a first step of the method immediately after the initiating "command". The control unit 80 controls the brewing device 30 in such a way that relative to the end surface 40 of the brewing cylinder (or the internal space 32) the end surface 34a of the brewing piston 34 is at a distance D1, which is as small as possible so that the volume of the brewing chamber 35 is as small as possible. Preferably the brewing cylinder 31 can be configured in such a way that D1=0 and therefore the volume of the brewing chamber 35 is equal to 0. The control unit 80 also controls the directional control valve 28 so that the directional control valve 28 is brought into the switching position shown in FIG. 1. The control unit 80 also controls the fluid pump 23 and the heating device 24 in such a way that the fluid (e.g. fresh water) provided in the tank 20 is heated by means of the heating device 24 to a temperature in the range of 75-115° C. and conveyed by the fluid pump 23 through the fluid feed line 26 to the directional control valve 28. As the position of the brewing piston 34 is selected so that D1 is as small as possible (preferably equal to 0) and the fluid feed line 26 is also fluidically connected to the drainage outlet 65, in this case the fluid heated by the heating device 24 essentially flows through the fluid feed line 26 to the drainage outlet 65 and through the drainage outlet 65 into the residual fluid container 70. Stagnant, relatively cold water which may previously have been present in the fluid feed line 26 and has cooled down, is completely displaced from the fluid feed line 26 by the fluid heated by the heating device 24 and also conveyed through the drainage outlet 65 into the residual fluid container 70. The quantity of heated water conveyed through the fluid feed line 26 can be approximately 20 ml, for example. The heated fluid finally results in warming of the fluid feed line 26.

FIG. 2 shows the coffee machine 10 during a second step of the method which immediately follows the first step shown in FIG. 1. The brewing chamber 35 is not filled with coffee powder (as in the first step of the method in accordance with FIG. 1). The control unit 80 controls the brewing device 30 in such a way that relative to the end surface 40 of the brewing cylinder 31 (or of the internal space 32), the end surface 34a of the brewing piston 34 is at a distance D2, which is greater than D1, for example, such the brewing chamber 35 has a volume of approximately 10 ml. The control unit 80 also controls the directional control valve 28 in such a way that the directional control valve 28 is brought into the switching position shown in FIG. 2. In this case the fluid feed line 26 is in fluidic connection with the fluid inlet 36 of the brewing chamber 35, whereas the drainage outlet 65 is not in fluidic connection with either the fluid feed line 26 or the fluid inlet 36 of the brewing chamber 35. The control unit 80 also controls the fluid pump 23 and the heating device 24 so that fluid (e.g. fresh water) provided in the tank 20 is heated by the heating device 24 to a temperature in the range of 75-115° C. and is conveyed by means of the fluid pump 23 through the fluid feed line 26 and the directional control valve 28 into the brewing chamber 35.

In the case of the switching position of the directional control valve 28 shown in FIG. 2, the heated fluid conveyed into the brewing chamber 35 cannot reach the residual fluid container 70 via the drainage outlet 65, but remains in the brewing chamber 35. Preferably a quantity of heated fluid is conveyed into the brewing chamber 35 that is so large that the brewing chamber 35 is completely filled with the heated fluid. The directional control valve 28 is controlled in such a way that the heated fluid remains in the brewing chamber 35 for a predetermined time interval, for example a time interval with a duration in the range of 0-10 seconds. During this time interval the brewing cylinder 31 and the brewing piston 34 are heated up in the areas which are in contact with the heated fluid, i.e. in the area of the end surface 40 and the side wall 41 of the brewing cylinder 31 and in the area of the end surface 34a of the brewing piston 34. The fluid present in the brewing chamber 35 can cool during this.

The directional control valve 28 is then controlled by the control unit 80 so that the directional control valve 28 takes up the switching position shown in FIG. 1. In accordance with this switching position of the directional control valve 28, the fluid feed line 26, the fluid inlet 36 of the brewing chamber 35 and the drainage outlet 65 are in fluidic connection with each other via the directional control valve 28. Accordingly, the fluid can be conveyed out of the brewing chamber 35 via the fluid inlet 36 of the brewing chamber 35 and the directional control valve 28 to the drainage outlet 65 so that the fluid can finally reach the residual fluid container 70 via the drainage outlet 65. In order to convey the fluid out of the brewing chamber 35 via the drainage outlet 65 into the residual fluid container 70, the control unit 80 controls the brewing device 30 in such a way that the brewing piston 34 moves along the longitudinal axis LA in the direction of the end surface 40 of the brewing cylinder 31 (or of the internal space 32) and the pushes the fluid through the fluid inlet 36 out of the brewing chamber 35.

FIG. 3 shows the coffee machine 10 during a third step of the method which immediately follows the second step shown in FIG. 2. During the third step, a predetermined quantity of coffee powder 38 is introduced into the brewing chamber 35, which in above-described second step of the method has been heated and thereby brought to a higher temperature. In FIG. 3 the coffee machine 10 is shown in a situation in which the predetermined quantity of coffee powder 38 has already been introduced into the brewing chamber 35 (as described above).

Furthermore, the control unit 80 controls the directional control valve 28 in such a way that the directional control valve 28 is brought into the switching position shown in FIG. 3. In this case the fluid feed line 26 is in fluidic connection with the fluid inlet 36 of the brewing chamber 35, whereas the drainage outlet 65 is not in fluidic connection with either the fluid feed line 26 or the fluid inlet 36 of the brewing chamber 35. The control unit 80 also controls the fluid pump 23 and the heating device 24 so that fluid (e.g. fresh water) provided in the tank 20 is heated to a temperature in the range of 90-95° C. and is conveyed by means of the fluid pump 23 through the fluid feed line 26 and the directional control valve 28 into the brewing chamber 35. Through brewing the coffee powder with the heated fluid, a coffee beverage is finally produced in the brewing chamber 35 and is conveyed through the fluid outlet 45 of the brewing chamber 35 to the coffee dispensing device 60 and is finally dispensed through the coffee outlet opening 62.

By way of the above-described pre-heating of the fluid feed line 26 and the brewing device 30, it is possible to massively increase the temperature of the coffee beverage dispensed through the coffee outlet opening 62 if the coffee machine 10 has previously not been used to produce a coffee beverage during a longer waiting period.

It is therefore expedient to only automatically implement the above-described pre-heating of the fluid feed line 26 and the brewing device 30 before producing a coffee beverage if the waiting time, during which the coffee machine 10 has not been use to prepare a coffee beverage, exceeds a predetermined limit (two minutes, for example). This controlling of pre-heating as a function of the waiting time allows the temperature control of the produced coffee beverage with a relatively low energy consumption.

It is also pointed out, that in the context of the invention, the brewing device 30 can be designed differently in terms of its structure from the embodiment shown in FIGS. 1-3, particularly with regard to the arrangement of the end surface 40 of the brewing cylinder 31 (or of the internal space 32), the brewing piston 34, the fluid inlet 36, the fluid outlet 45 and the drainage outlet 65. In the embodiment of the brewing device 30 according FIGS. 1-3, the end surface 40 of the brewing cylinder 31 (or of the internal space 32) is arranged below the brewing chamber 35 and the end surface 34*a* of the brewing piston 34. Alternatively, it would also be possible for the end surface 40 of the brewing cylinder (or of the internal space 32) to be arranged above the brewing chamber 35 and the end surface 34*a* of the brewing piston 34.

In the embodiment of the brewing device 30 according to FIGS. 1-3, the fluid inlet 36 for letting the heated fluid into the brewing chamber 35, and the fluid outlet 45 for dispensing a coffee beverage produced in the brewing chamber 35 are arranged in such a way that the heated fluid can be conveyed into the brewing chamber 35 from below through the fluid inlet 36 arranged under the brewing chamber 35, and a coffee beverage produced in the brewing chamber 35 can be removed upwards out of the brewing chamber 35 through the fluid outlet 45 arranged above the brewing chamber 35. Alternatively, the fluid inlet 36 for letting the heated fluid into the brewing chamber 35, and the fluid outlet 45 for dispensing a coffee beverage produced in the brewing chamber 35 can be arranged in such a way that the heated fluid can be introduced into the brewing chamber 35 from above through a fluid inlet arranged above the brewing chamber 35, and a coffee beverage produced in the brewing chamber 35 can be removed out of the brewing chamber 35 downwards through a fluid outlet arranged under the brewing chamber 35.

In the form of embodiment of the brewing device 30 according to FIGS. 1-3, the drainage outlet 65 is implemented in such a way that a residual fluid can flow downwards out of the brewing chamber 35 through the fluid inlet 36 and eventually reach the drainage outlet 65 via the directional control valve 28. Alternatively, the drainage outlet can also be implemented in that it is separate from the fluid inlet 36 and opens directly into the brewing chamber 35 (at a predetermined distance from the fluid inlet 36).

The invention claimed is:

1. A method for producing a coffee beverage in a coffee machine (10),
   wherein the coffee machine (10) comprises:
   a brewing device (30) with a brewing chamber (35) for receiving coffee powder, said brewing chamber (35) comprising at least one fluid inlet (36) and one fluid outlet (45);
   a fluid system (12) with a fluid feed line (26) connected to the fluid inlet (36) and a fluid conveyor (15) for conveying a heated fluid through the fluid feed line (26) and with a drainage outlet (65) separate from the fluid outlet (45),
   said drainage outlet (65) being in, or being configured to be brought into fluidic connection with the brewing chamber (35) and/or the fluid feed line (26) so that a residual fluid is enabled to be discharged from the fluid feed line (26) and/or the brewing chamber (35) through the drainage outlet (65);
   wherein the brewing device (30) comprises:
   a brewing cylinder (31) with an internal space (32) which has a longitudinal axis (LA) and is limited on one end face by an end surface (40) extending transversely to the longitudinal axis (LA) and is limited radially to the longitudinal axis (LA) by a side wall (41) extending about the longitudinal axis (LA);
   a brewing piston (34) which extends in the direction of the longitudinal axis (LA) so that an end surface (34*a*) of the brewing piston (34) is arranged opposite the end surface (40) of the internal space (32),
   wherein the brewing chamber (35) extends between the end surface (40) of the internal space (32), the end surface (34*a*) of the brewing piston (34) and the side wall (41) and the brewing piston (34) is configured to be moved along the longitudinal axis (LA) so that a distance (D1, D2) between the end surface (40) of the internal space (32) and the brewing piston (34) is changeable;

wherein the method comprises the following steps (a)-(d):

(a) introducing a predetermined quantity of coffee powder (38) into the brewing chamber (35), (b) conveying heated fluid through the fluid feed line (26) into the brewing chamber (35) for preparing a coffee beverage through brewing the coffee powder in the brewing chamber (35) and dispensing a prepared coffee beverage from the brewing chamber (35) through the fluid outlet (45), (c) conveying a first quantity of heated fluid through the fluid feed line (26) into the brewing chamber, whereby step (c) is carried out before step (a), (d) discharging at least one part of the first quantity of heated fluid supplied in step (c) from the brewing chamber (35) before the start of step (a), wherein in step (d), the at least one part of the first quantity of heated fluid supplied in step (c) is discharged through the drainage outlet (65), wherein the method comprises the following steps (f) and (g):

(f) before the start of or during step (c), the brewing piston (34) is arranged in such a way that the brewing piston (34) is at a first predetermined distance (D2) relative to the end surface (40) of the internal space (32);

(g) during step (d), the brewing piston (34) is moved along the longitudinal axis (LA) so that the brewing piston (34) is relative to the end surface (40) of the internal space (32) at a distance (D1) which is smaller than the first predetermined distance (D2).

2. The method according to claim 1, wherein step (c) is carried out at a predetermined first time interval before the start of step (a).

3. The method according to claim 1, wherein step (d) is carried out at a predetermined second time interval before the start of step (a).

4. The method according to claim 3, wherein the conveying of the first quantity of heated fluid in accordance with step (c) is ended at a first end time and the start of the second time interval follows the first end time with a predetermined first time difference.

5. The method according to claim 4, wherein the first time difference is 0 to 10 seconds.

6. The method according to claim 1, wherein the conveying of a first quantity of heated fluid in accordance with step (c) is ended at a first end time, the introduction of the predetermined quantity of coffee powder (38) into the brewing chamber (35) in accordance with step (a) takes place after step (c) during a third time interval and the start of the third time interval follows the first end time with a predetermined second time difference.

7. The method according to claim 6, wherein the second time difference is 1 to 20 seconds.

8. The method according to claim 1, wherein the method comprises the following step (e):

(e) conveying a second quantity of heated fluid through the fluid feed line (26) and discharging the second quantity of heated fluid through the drainage outlet (65), wherein step (e) is carried out before step (c).

9. The method according to claim 8, wherein the coffee machine (10) comprises a residual fluid container (70) for receiving a residual fluid discharged from the drainage outlet (65), and wherein in step (e) the second quantity of heated fluid is discharged into the residual fluid container (70).

10. The method according to claim 8, wherein during conveying in accordance with step (e), the heated fluid is at a temperature which is in the range of 75-115° C.

11. The method according to claim 8, which comprises the following step (h):

(h) before the start of or during step (e), the brewing piston (34) is arranged in such a way that the brewing piston (34) is at a distance (D1) relative to the end surface (40) of the internal space (32) that is equal to a predetermined minimum value.

12. The method according to claim 1, wherein the coffee machine (10) comprises a residual fluid container (70) for receiving a residual fluid discharged from the drainage outlet (65), and wherein in step (d) the at least one part of the first quantity of heated fluid supplied in step (c) is discharged into the residual fluid container (70).

13. The method according to claim 1, wherein during conveying in accordance with step (c), the heated fluid is at a temperature which is in the range of 75-115° C.

14. The method according to claim 1, wherein the first quantity of heated fluid has such a large volume that during step (c) the brewing chamber (35) is fully or partially filled with heated fluid.

* * * * *